(12) United States Patent
Takafuji et al.

(10) Patent No.: US 7,150,179 B2
(45) Date of Patent: Dec. 19, 2006

(54) IMPACT SENSOR FOR DETECTING AN IMPACT OF A COLLISION

(75) Inventors: Tetsuya Takafuji, Anjo (JP); Yoshiyuki Hattori, Toyoake (JP)

(73) Assignee: Denso Corporation, Kariya (JP)

( * ) Notice: Subject to any disclaimer, the term of this patent is extended or adjusted under 35 U.S.C. 154(b) by 147 days.

(21) Appl. No.: 10/972,443

(22) Filed: Oct. 26, 2004

(65) Prior Publication Data
US 2005/0092061 A1    May 5, 2005

(30) Foreign Application Priority Data
Oct. 29, 2003    (JP)    ............... 2003-369495

(51) Int. Cl.
*G01N 33/28*    (2006.01)
*G01M 7/00*    (2006.01)
(52) U.S. Cl. .................................. 73/12.09
(58) Field of Classification Search ............... 73/12.01, 73/12.09, 862.451 P, 862.471 P
See application file for complete search history.

(56) References Cited

U.S. PATENT DOCUMENTS

| | | | |
|---|---|---|---|
| 4,734,092 A * | 3/1988 | Millerd | ........................ 604/67 |
| 5,728,983 A | 3/1998 | Ishihara et al. | |
| 6,439,056 B1 * | 8/2002 | Jonsson | ........................ 73/708 |
| 6,510,914 B1 | 1/2003 | Ishizaki et al. | |
| 6,606,914 B1 * | 8/2003 | Kume | ........................ 73/849 |
| 2001/0017587 A1 * | 8/2001 | Suzuki et al. | ............ 340/545.7 |
| 2004/0010208 A1 * | 1/2004 | Ayad | ........................ 600/587 |

FOREIGN PATENT DOCUMENTS

JP    A-H07-141958    6/1995

* cited by examiner

*Primary Examiner*—Max Noori
(74) *Attorney, Agent, or Firm*—Posz Law Group, PLC

(57) ABSTRACT

An impact sensor includes the first and the second electrodes arranged a predetermined distance away from each other in a tube insulator. The impact sensor is arranged at a front of a vehicle such that the first and the second electrodes opposed to each other in the front-to-rear direction of the vehicle. The first and the second electrodes include cable conductors sheathed with elastically deformable conductive members, respectively. The first and the second electrodes are apart from each other when no impact is applied to the impact sensor. When a collision occurs and the impact is applied to the impact sensor, a contact area between the conductive members increases and a resistance between the first and the second electrodes continuously decreases.

21 Claims, 6 Drawing Sheets

IMPACT SENSOR FOR DETECTING AN IMPACT OF A COLLISION

CROSS REFERENCE TO RELATED APPLICATION

This application is based on and incorporates herein by reference Japanese Patent Application No. 2003-369495 filed on Oct. 29, 2003.

FIELD OF THE INVENTION

The present invention relates to an impact sensor for detecting an impact of a collision.

BACKGROUND OF THE INVENTION

An impact sensor is used in a pedestrian protection system including an active hood system and a hood airbag in a vehicle. The impact sensor detects an impact of a collision with an object for determining whether the object is a pedestrian. When the object is determined as a pedestrian, the pedestrian protection system is activated.

An acceleration sensor arranged on the back of a bumper cover of a vehicle for detecting an impact of a collision is proposed in JP-A-2002-36994. This acceleration sensor provides a quick response because it is arranged on the back of the bumper cover. However, it is difficult to distinguish an impact due to a collision with a pedestrian from an impact due to bad road conditions.

A restive film pressure sensor is also used for detecting an impact of a collision. The pressure sensor has a structure that a conductive rubber containing carbon or metal powder is sandwiched by a pair of electrodes. The electrodes are electrically connected with each other via a resistor in a normal condition. Therefore, the sensor consumes a large amount of direct-current power and a decrease in resistance at a collision is relatively small.

Moreover, pressure switches are proposed in JP-A-09-180578 and JP-A-07-141958. In these switches, a pair of electrode lines is fixed to an inner surface of a rubber tube. A pair of conductive rubbers, which come into contact with the electrode lines, respectively. When a large amount of pressure is applied to the rubber tube, the rubber tube is flattened and the conductive rubbers are electrically connected. As a result, the pressure switch is closed. When the pressure is released, the rubber tube returns to its original form and the conductive rubbers become apart from each other. Thus, the switch becomes open.

The pressure switches are formed in a belt for providing a large sensing area. The rubber tube of the pressure switch does not elastically deform as the two electrodes come into contact with each other under a threshold pressure in principle. When the pressure applied to the rubber tube exceeds the threshold pressure, the rubber tube deforms such that the two electrodes come into close contact with each other. These pressure switches are difficult to apply for detecting an impact of a collision.

SUMMARY OF THE INVENTION

The present invention therefore has an objective to provide an impact sensor that properly detects an impact of a collision for large areas of a vehicle with a simple structure. An impact sensor of the present invention is arranged along a body of a vehicle in a side-to-side direction of the vehicle for detecting an impact of a collision.

The impact sensor includes fist and second electrodes, first and second resistive member, and an elastic member. Each of the first and the second electrodes has electric conductivity and a cord-shape. Each of the first and the second resistive members has a cord-shape and a predetermined resistivity on at least one of surfaces, and attached to the electrodes. The elastic member holes the first and the second electrodes and the resistive member. It has a shape and elasticity such that a contact area between the resistive members varies according to the impact of a collision, and an electric resistance between the first and the second electrodes varies in positive correlation with the impact of a collision in a predetermined range.

The electrodes are made of metal having higher conductivity than the resistive members. It may be made of rubber in which a large amount of conductive power is dispersed. The resistive members are made of conductive powder dispersed rubber or resin that is elastically deformable. Alternatively, it is made of an elastically deformable conductive resin or metal piece. The elastic member is made of rubber that is elastically recoverable of its forms. It can be made of elastically recoverable metal piece if electric insulator between the electrodes can be provided with a resin.

The electrodes are electrically apart from each other and a resistance between them is very high. Namely, consumption of direct current power is reduced. When a collision occurs, the elastic member elastically deforms and a contact area between the electrodes via the resistive members varies in positive correlation with the impact of a collision in a predetermined range. With this configuration, the impact sensor that properly detects an impact of a collision is provided with a simple structure at a low manufacturing cost.

Furthermore, the impact sensor can detect an impact of a collision measured at a point where an object collides. As a result, an erroneous detection due to vibration of the vehicle and distortion in sensor signals due to a location of point where an object collides can be reduced. The impact sensor also provides quick response and therefore sufficient time can be reserved for determining a kind of the object and activating a necessary means.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
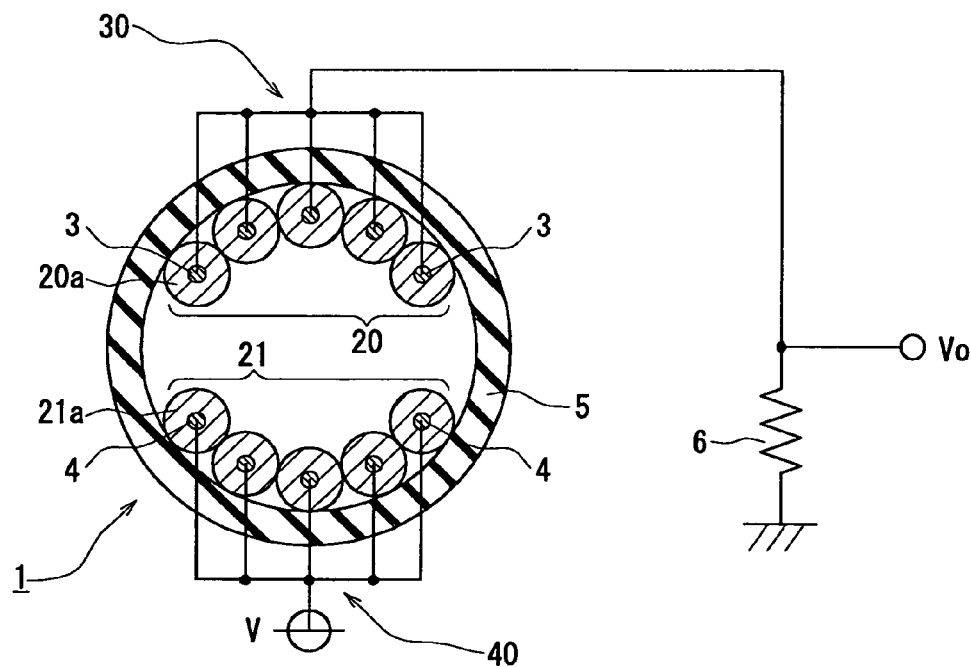
FIG. 1 is a cross-sectional view of an impact sensor with a circuit connection according to the first embodiment of the present invention.

The preferred embodiments of the present invention will be explained with reference to the accompanying drawings. In the drawings, the same numerals are used for the same components and devices.

[First Embodiment]

Referring to FIG. 1, an impact sensor 1 includes first and second conductive members 20, 21, the first group of five cable conductors (first cable conductors) 3, and the second group of five cable conductors (second cable conductors) 4, and a tube insulator 5. Each conductive member 20, 21 includes five first conductive elements 20a and five second conductive elements 21a. Each of the conductive elements 20a, 21a is made of conductive powder dispersed rubber and formed in a cylindrical shape, or a cord shape, and has a predetermined resistivity on at least a part of its surface. The first conductive elements 20a sheath the first cable conductors 3 and the second conductive elements 21a sheath the second cable conductors 4. The first and the second conductive elements 20a, 21a are arranged in parallel to each other in the longitudinal direction of the tube insulator 5 and fixed to an inner periphery of the tube insulator 5.

Each of the first and the second cable conductors 3, 4 is a cupper cable and has electric conductivity and a cord-shape. The first cable conductors 3 and the second cable conductors 4 form the first electrode 30 and the second electrode 40, respectively. A source voltage V produced by a direct current power source is applied to the second electrode 40. The electrode 30 is grounded via an output detecting resistor 6. An output terminal of the impact sensor 1 is connected to a connecting point of the first electrode 30 and the resistor 6 and an output voltage Vo is outputted from this output terminal.

The tube insulator 5, which is an elastic member, is made of rubber. It holds the first and the second conductive members 20, 21 and the first and the second cable conductors 3, 4. It has a shape and elasticity such that a contact area between the first and the second conductive members 20, 21 varies according to an impact of a collision. The tube insulator 5 functions as a housing for the first and the second cable conductors 3, 4. It enhances protection of the conductive members 20, 21 and the cable conductors 3, 4 in mechanical, electrical, and chemical perception, resulting in improvement in environment resistance and operational reliability.

The conductive elements 20a, 21a can be arranged with spaces between them although they are contacted with each other as shown in FIG. 1. The first and second electrodes 30, 40 are arranged a predetermined distance away from each other in the front-rear direction of a vehicle under a normal condition, that is, a condition that no collision has occurred.

Figure 2:
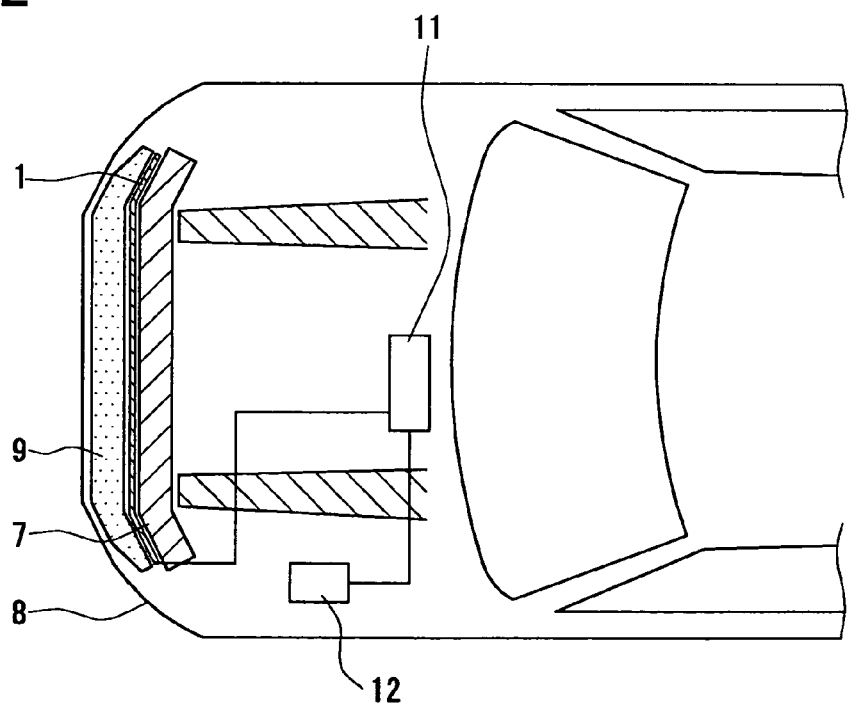
FIG. 2 is a schematic perspective view of a vehicle with the impact sensor according to the first embodiment.

Referring to FIG. 2, the impact sensor 1 is arranged in the side-to-side direction of the vehicle at the front of a bumper reinforce 7 such that the first and the second conductive members 20, 21 oppose to each other in the front-to-rear direction of the vehicle. If an object, for instance, a pedestrian collides against a bumper cover 8, the bumper cover 8 and a bumper absorber 9 arranged immediately behind the bumper cover 8 are deformed. An impact of the collision is transmitted to the impact sensor 1. The tube insulator 5 elastically deforms due to the impact of the collision and a contact area between the first and the second conductive members 20, 21 increases in positive correlation with the impact of the collision. The resistance between the first and the second electrodes 30, 40 varies (decreases) in positive correlation with the impact of the collision. The output voltage Vo increases in positive correlation with the impact of the collision.

If the object is hit away and the impact of the collision decreases, the tube insulator 5 returns to its original form because of its elasticity. As a result, the output voltage Vo returns to its original level. Namely, the impact sensor 1 immediately detects the impact of the collision and outputs a waveform signal properly indicating the impact of the collision. The output voltage Vo is inputted to a controller 11 and the controller 11 determines whether the object is a pedestrian based on the waveform signal. A method of the determination will not be discussed because it is not a scope of this invention.

Figure 3:
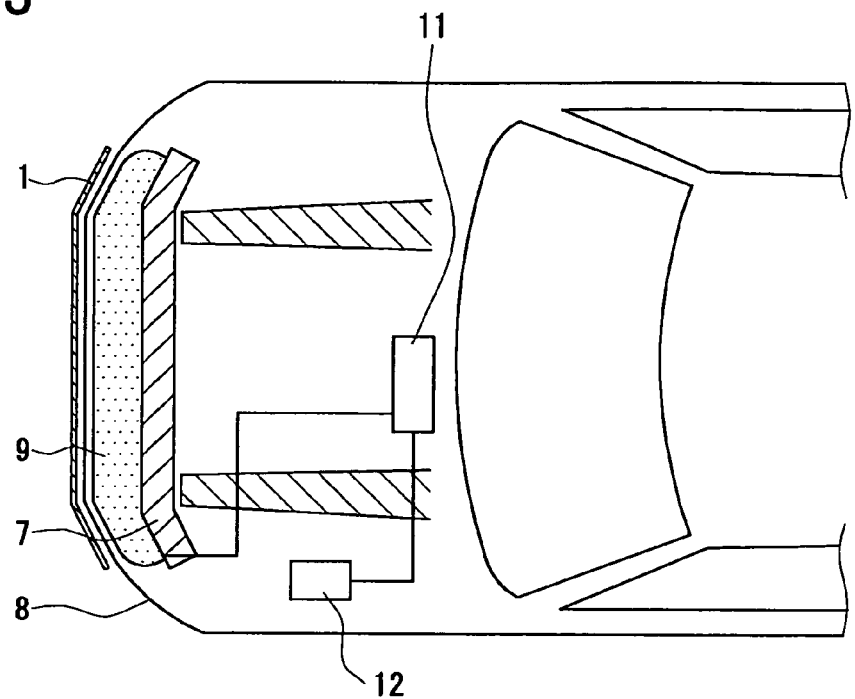
FIG. 3 is a schematic perspective view of a vehicle with the impact sensor attached to the front of a bumper cover according to the first embodiment.
Figure 4:
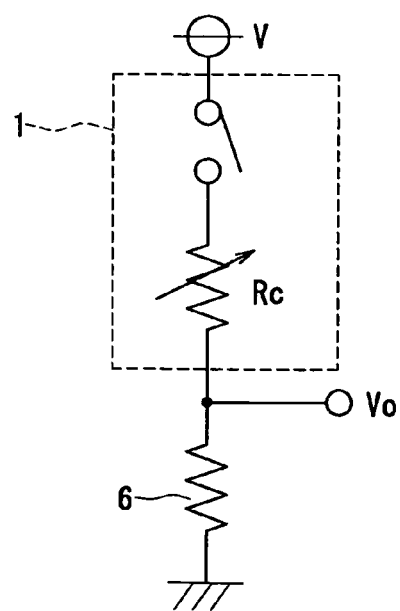
FIG. 4 is an equivalent circuit diagram of the impact sensor according to the first embodiment.

The impact sensor 1 can be arranged on a front surface of the bumper cover 8 as shown in FIG. 3 to improve a response speed. An equivalent circuit of the impact sensor 1 and the output detecting resistor 6 is shown in FIG. 4. The impact sensor 1 has a switch function for interrupting current in the normal condition, and a variable resistor function for varying the resistance according to the impact of the collision when a collision occurs. The impact sensor can be configured not to have the switch function by maintaining slight contact between the first and second conductive members 20, 21 in the normal condition.

Figure 5:
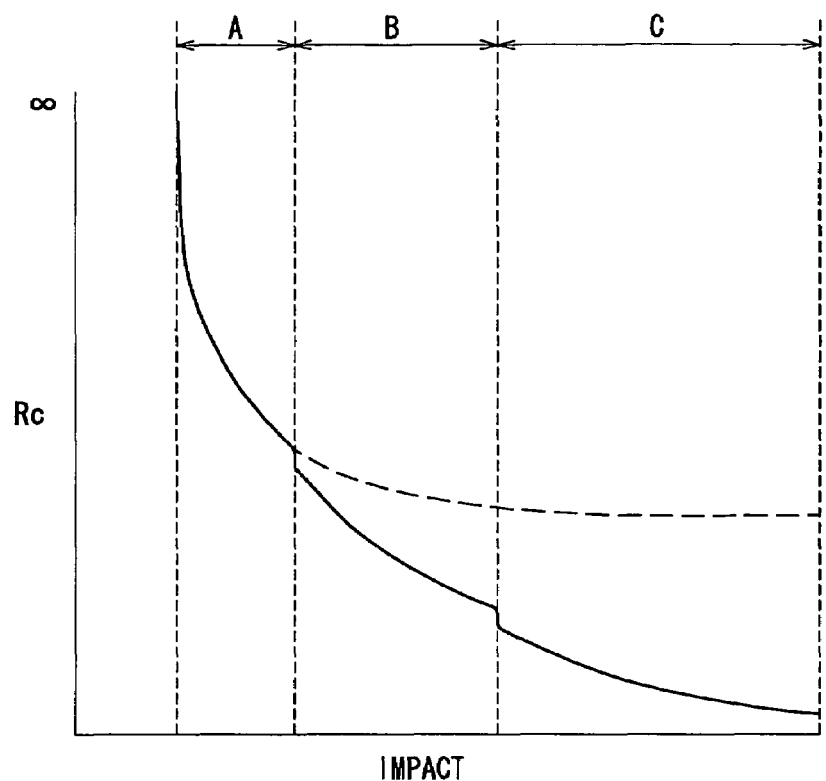
FIG. 5 is a graph showing relationships between electric resistances of the impact sensor and an impact of a collision according to the first embodiment.

Resistance Rc between the first electrode 30 and the second electrode 40 vary gradually or stepwise according to variations in the impact of the collision as shown in FIG. 5. Resistivity of the conductive members 20, 21 is relatively small in comparison with the contact resistance between the first and the second electrodes 30, 40. It can be set at a different rate as necessary. The curve indicated with dashed-line shows the relationship between the resistance between the impact of the collision in a case that each of the first and the second electrodes 30, 40 include each of cable conductors 3, 4, respectively. The variation in the resistance Rc between the first and the second electrodes 30, 40 increases as the number of the cable conductors 3, 4 increases.

Figure 6A:
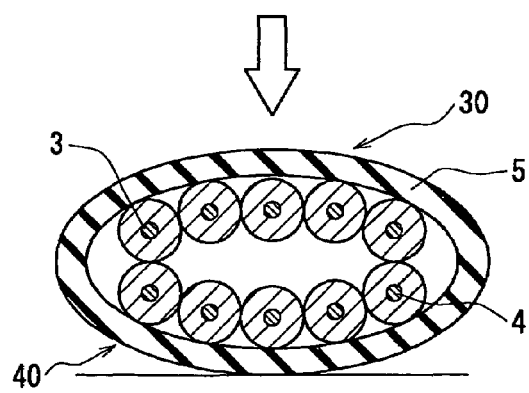
FIG. 6A is a cross-sectional view of the impact sensor when a relatively small impact is applied to the impact sensor due to a collision according to the first embodiment.
Figure 6B:
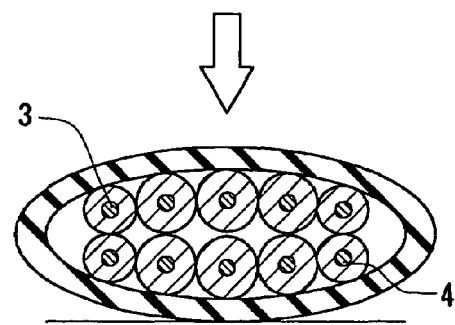
FIG. 6B is a cross-sectional view of the impact sensor when a relatively large impact is applied to the impact sensor due to a collision according to the first embodiment.

When an impact of a collision is small, a degree of the deformation of the tube insulator 5 is also small. In this case, the conductive elements 20a, 21a located at each outermost position in a line of the conductive elements 20a, 21a come into contact with each other as shown in FIG. 6A. Other conductive elements 20a, 21a located at an inner position are not in contact with each other. The relationship between the resistance Rc and the impact in this condition is indicated with the dashed-line in FIG. 5. The resistance Rc decreases as a force applied to the tube insulator 5 increases, that is, an impact of a collision increases.

When an impact of a collision is large, a degree of the deformation of the tube insulator 5 is also large. In this case, the conductive elements 20a, 21a located not only at the outermost positions but also at the inner positions also come into contact with each other. As a result, the resistance Rc becomes small. The resistance Rc decreases as the number of the conductive elements 20a, 21a that are in contact increases, namely, an impact of a collision increases.

The relationship between the resistance Rc and an impact of a collision is indicated with solid line in FIG. 5. When only outermost conductive elements 20a, 21a are in contact, the resistance Rc decreases as shown in area A. When the conductive elements 20a, 21a located at other than the center of the tube insulator are in contact, the resistance Rc decreases as indicated with the solid line in area B. When all of the conductive members 2 are in contact, the resistance Rc decreases as indicated with the solid line in area C.

The conductive elements 20a, 21a are pressed in the front-to-rear direction and flattened in the side-to-side direction of the vehicle when a force is applied due to a collision. As a result, electric resistances of the conductive elements 20a, 21a decrease. Since resistivity in the conductive elements 20a, 21a varies according to a variation in an impact of a collision, this variation in the resistivity can be used for detecting an impact of a collision.

The impact sensor may be integrated to the bumper cover 8 or the bump absorber 9. The first and the second electrodes 30, 40 can be elastically deformable thin plates having arc-shaped or rectangular cross-sections, and sheathed with the conductive elements 20a, 21a. The first cable conductors 3 may be integrated and the conductive member 20 that sheaths the cable conductors 3 is formed such that an overall shape of its cross-section takes a form of an arc or a letter V, a peak of which points to the center of the tube insulator 5. The second cable conductors 4 and the second conductive member 21 can be formed in the same manner as the cable conductors 3 and the first conductive member 20.

It is preferable to attach the first and the second conductive member 20, 21 to the first and the second cable conductors 3, 4, respectively as in the impact sensor 1. However, only either of the first and the second conductive members 20, 21 may be attached to one of the first and the second cable conductors 3, 4. Attaching the first and the second conductive members 20, 21 to the first and the second cable conductors 3, 4 is especially preferable when using the variation in resistance according to the variation in contact area for detecting an impact of a collision. Furthermore, the cable conductors 4 may be grounded.

[Second Embodiment]

Figure 7:
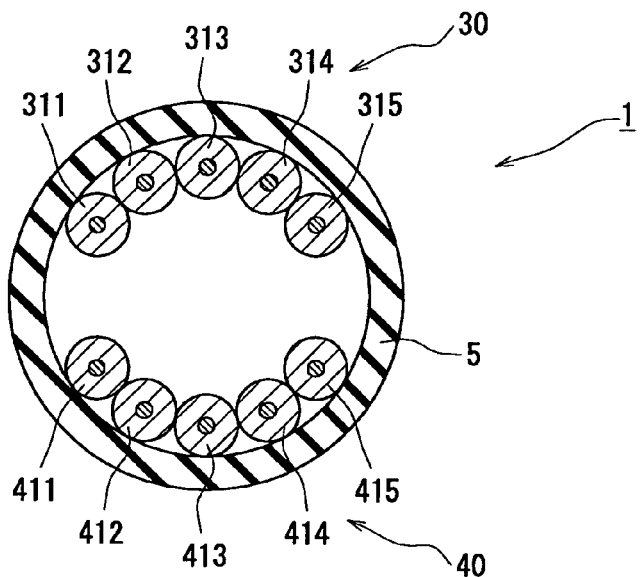
FIG. 7 is a cross-sectional view of an impact sensor according to the second embodiment of the present invention.

Referring to FIG. 7, the impact sensor 1 includes conductive elements 311–315, 411–415 having different rates of resistivity. The outermost conductive elements 311, 315 of the first electrode 30 have high resistivity, and the center conductive element 313 has low resistivity. The intermediate conductive elements 312, 314 between the center conductive element 313 and the outer most conductive elements 311, 315 have intermediate resistivity between the high and the low resistivity. Likewise, the outermost conductive elements 411, 415 of the first electrode 40 have high resistivity, and the center conductive element 413 has low resistivity. The intermediate conductive elements 412, 414 between the center conductive element 413 and the outer most conductive elements 411, 415 have intermediate resistivity between the high and the low resistivity.

With this configuration, a large variation range can be set for the resistance when an impact of a collision is small and a small variation range can be set when the impact is large. Thus, the output voltage Vo largely varies when the impact of the collision is in a target range for necessary collision detection.

[Third Embodiment]

Figure 8:
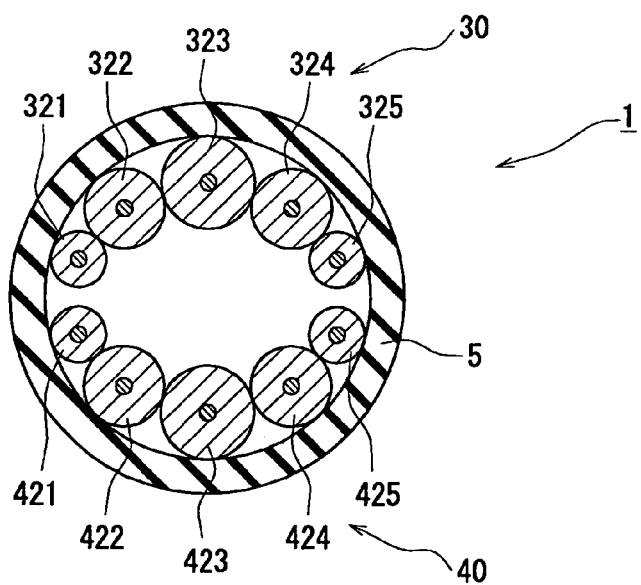
FIG. 8 is a cross-sectional view of an impact sensor according to the third embodiment of the present invention.

Referring to FIG. 8, conductive elements 321–325 have different diameters. More specifically, the outermost conductive elements 321, 325 have a small diameter and the center conductive element 323 has a large diameter. The intermediate conductive elements 322, 324 between the center conductive element 323 and the outermost conductive elements 321, 325 have an intermediate diameter between the large and the small diameter. Likewise, the outermost conductive elements 421, 425 have a small diameter and the center conductive element 423 has a large diameter. The intermediate conductive elements 422, 324 between the center conductive element 423 and the outermost conductive elements 421, 425 have an intermediate diameter between the large and the small diameter.

When the impact of the collision is small, the contact areas of the center conductive elements 323, 423 and the intermediate conductors 322, 324, 422, 424 vary in a small range. As a result, the electric resistance Rc between the first and the second electrodes 30, 40 varies in a high resistance range. When the impact of the collision is large, the center conductive elements 323, 423 come into contact with each other and the contact area of the center conductive elements 32, 423 varies a large range. As a result, the electric resistance Rc between the first and the second electrodes 30, 40 varies in a low resistance range.

With this configuration, the contact resistance varies inversely proportional to the contact area. When the impact of the collision is small, the contact area is smaller than that of the first and the second embodiments. When the impact of the collision is large, the contact area is larger than that of the first and the second embodiments. Thus, the output voltage Vo largely varies when the impact of the collision is in a target range for necessary collision detection and the target range can be expanded.

[Fourth Embodiment]

Figure 9:
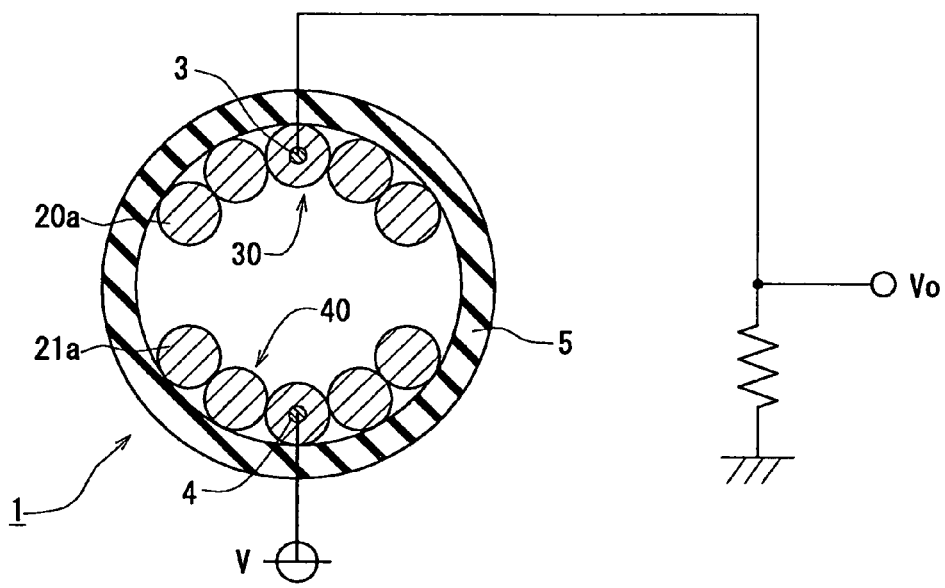
FIG. 9 is a cross-sectional view of an impact sensor according to the fourth embodiment of the present invention.

Referring to FIG. 9, only one cable conductor 3 is provided inside the center conductive element 20a. No cable conductors 3 are provided in and the outermost conductive elements 20a and intermediate conductive elements 20a located between the center conductive element 20a and the outermost conductive elements 20a. Likewise, only one cable conductor 4 is provided inside the center conductive element 21a. No cable conductors 4 are provided in and the outermost conductive elements 21a and intermediate conductive elements 21a located between the center conductive element 2 and the outermost conductive elements 21a. The adjacent conductive elements 21a have contact with each other to form the first electrode 30 and the second electrode 40, respectively. The cable conductor 3 functions as an output electrode.

Figure 10A:
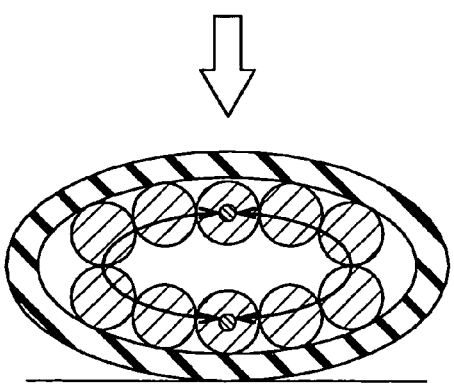
FIG. 10A is a cross-sectional view of the impact sensor when a relatively small impact is applied to the impact sensor due to a collision according to the fourth embodiment.

When an impact of a collision is small, only the outermost conductive elements 20a, 21a come into contact with each other as shown in FIG. 10A and electric paths are formed as indicated arrows. A reduction in resistance is transmitted to the cable conductors 3, 4 via other conductive elements 20a, 21a. As a result, a resistance between the first and the second electrodes 30, 40 varies in a high resistance range.

Figure 10B:
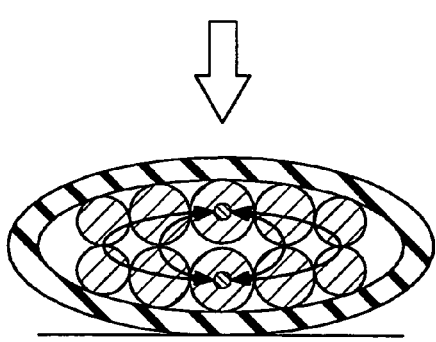
FIG. 10B is a cross-sectional view of the impact sensor when a relatively large impact is applied to the impact sensor due to a collision according to the fourth embodiment.

When the impact is large, not only the outermost and the intermediate conductive elements 20a, 21a but also the center conductive elements 20a, 21a come into contact with each other as shown in FIG. 10B. Electric paths are formed as indicated with arrows. Namely, the center conductive elements 20a, 21a electrically connect the cable conductors 3, 4 without intervention of other conductive elements 20a, 21a. Therefore, the resistance between the first and the second electrodes 30, 40 varies in a low resistance range.

The cable conductors 3, 4 are sheathed by the conductive elements 20a, 21a that come into contact with each other when the impact of a collision is in the largest range. The same effects as that of the second and the third embodiments are produced. The cable conductors 3, 4 can be provided inside the intermediate and the outermost conductive elements 20a, 21a.

[Fifth Embodiment]

Figure 11:
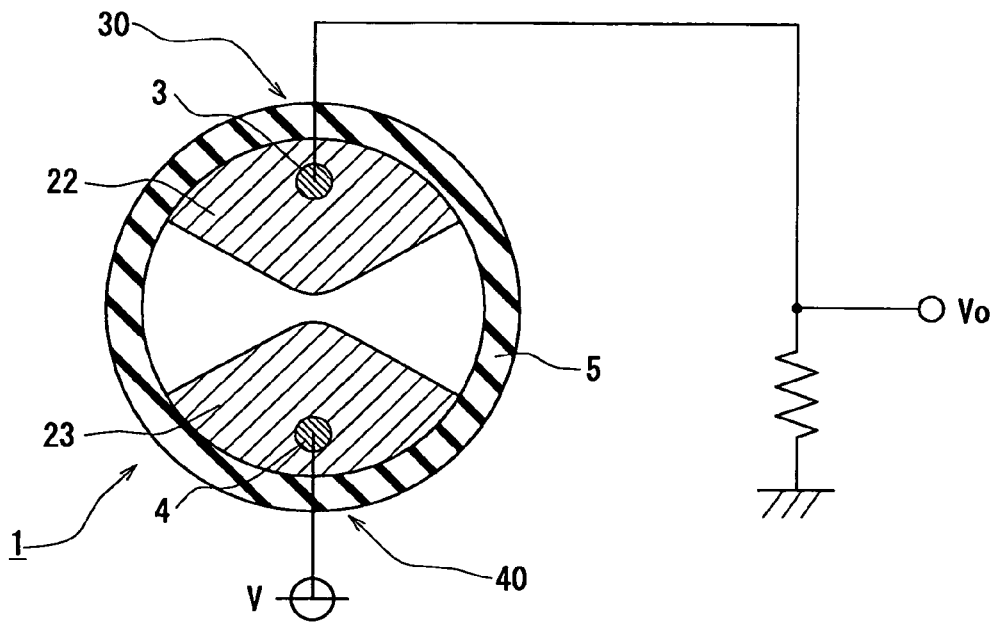
FIG. 11 is a cross-sectional view of an impact sensor according to the fifth embodiment of the present invention.

Referring to FIG. 11, the first electrode 30 is constructed of a single cable conductor 3 sheathed with a conductive member 22 that includes only one conductive element. The second electrode 40 is constructed of a single cable conductor 4 sheathed with a conductive member 23 that includes only one conductive element. Each conductive member 22, 23 is formed in a ridge that tapers toward the center of the tube insulator 5. The peaks of the conductive members 22, 23 are opposed to each other. Each conductive member 22, 23 has a V-shape cross-section.

When an impact of a collision is small, only areas around the tips of the conductive members 22, 23 come into contact with each other and an electric resistance of the impact sensor becomes high. The contact area of the conductive members 22, 23 becomes large as the impact of a collision increases and the resistance of the impact sensor 1 decreases. The conductive members 22, 23 can be formed to have a triangle cross-section, a trapezoid cross-section, or an inverted V-shape cross-section.

[Sixth Embodiment]

Figure 12:
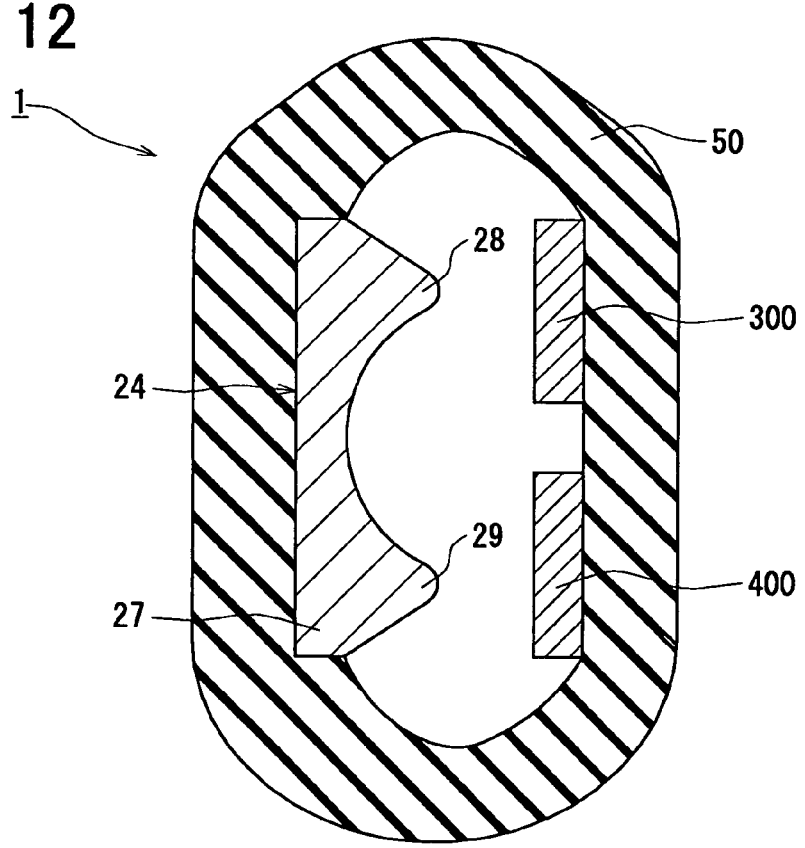
FIG. 12 is a cross sectional view of an impact sensor according to the sixth embodiment of the present invention.

Referring to FIG. 12, the impact sensor 1 has band-shaped cable conductors 300, 400 arranged in the side-to-side direction of the vehicle and at a predetermined distance vertically away from each other. A conductive member 24 is arranged anterior to and facing the cable conductors 300, 400. The conductive member 21 has a base portion 27 that has a flat shape and crest portions 28, 29 that extrude from the base portion 27. Under normal driving conditions, the conductive member 21 does not touch the cable conductors 300, 400. Therefore, no current flows between the cable conductors 300, 400.

When a collision occurs, the conductive member 24 deforms in a degree corresponding to the impact of the collision. The crest portions 28, 29 of the conductive member 24 touch the cable conductors 300, 400 when a certain amount of impact is applied to the impact sensor 1. As a result, an electric resistance between the cable conductors 300, 400 decreases. A movable piece of electrode (an intermediate electrode) may be provided on a back surface of the conductive member 24, that is, more to the front of the vehicle than the conductive member 24.

The present invention should not be limited to the embodiment previously discussed and shown in the figures, but may be implemented in various ways without departing from the spirit of the invention. For instance, the cable conductors 3, 4 may be sheathed with the conductive members 20, 21, 22, 23, 24 around the areas that contact with other conductive members 20, 21, 22, 23, 24. The cable conductors 3, 4 may have any shapes of cross-sections other than a circle. Moreover, the grounded bumper reinforce 7 or a body of the vehicle may be used as one of the cable conductors 3, 4.

The cable conductors 3, 4 can be arranged in parallel to and a predetermined distance away from each other in the top-to-bottom direction of the vehicle. In this case, the conductive member 20, 21, 22, 23, 24 may be arranged a predetermined distance away from the cable conductors 3, 4 in the front-to-rear direction of the vehicle. Alternatively, the conductive member 20, 21, 22, 23, 24 and an intermediate cable conductor may be arranged a predetermined distance away from the cable conductors 3, 4 in the front-to-rear direction of the vehicle.

If only the conductive member 20, 21, 22, 23, 24 is provided and an impact due to a collision is applied to the impact sensor 1, the conductive element 20, 21, 22, 23, 24 receive the impact directly or via other materials. As a result, the conductive elements 20a, 21a deform and connect with the cable conductors 3, 4. A contact area between at least one of the cable conductors 3, 4 and the conductive element 20, 21, 22, 23, 24 varies and the resistance between the cable conductors 3, 4 varies gradually or stepwise according to the impact of a collision.

If the conductive member 20, 21, 22, 23, 24 and the intermediate cable conductor are provided, the conductive member 20, 21, 22, 23, 24 receives the impact directly or via other materials. As a result, the conductive elements 20a, 21a deform and connect with the cable conductors 3, 4. A contact area between at least one of the cable conductors 3, 4 and the conductive element 20, 21, 22, 23, 24 varies. Current flows from one of the cable conductors 3, 4, to the conductive member 20, 21, 22, 23, 24, to the intermediate cable conductor, to the conductive member 20, 21, 22, 23, 24, and to the other cable conductor 3, 4 in this order. The resistance between the cable conductors 3, 4 varies gradually or stepwise according to the impact of a collision. Current is also flows from the conductive member 20, 21, 22, 23, 24 to the conductive member 20, 21, 22, 23, 24 without flowing through the intermediate cable conductor.

What is claimed is:

1. An impact sensor arranged along a body of a vehicle in a side-to-side direction of the vehicle for detecting an impact of a collision, comprising:
    first and second electrodes, each of which has electric conductivity and a cord-shape;
    first and second resistive members, each of which has a cord-shape and a predetermined resistivity on at least one of surfaces, and attached to the electrodes; and
    an elastic member that holds the electrodes and the resistive members, wherein
    the elastic member has a shape and elasticity such that a contact area between the first and the second resistive members varies gradually or stepwise according to the impact of a collision, and an electric resistance between the first and the second electrodes varies in positive correlation with the impact of a collision in a predetermined range.

2. The impact sensor according to claim 1, wherein:
    the first and the second electrodes includes a plurality of electrode lines; and
    the electrode lines of the first electrode come into contact with the corresponding electrode lines of the second electrode via the first and the second resistive members according to the impact of a collision.

3. The impact sensor according to claim 2, wherein:
    the first and the second resistive members includes a plurality of the resistive elements; and
    the electrode lines of the first and the second electrodes are individually sheathed with the resistive elements.

4. The impact sensor according to claim 3, wherein the resistive elements have different rates of resistivity.

5. The impact sensor according to claim 3, wherein the resistive elements have different cross-sectional areas.

6. The impact sensor according to claim 3, wherein the resistive elements have approximately round cross-sections.

7. The impact sensor according to claim 2, wherein:
one of the electrode lines of the first electrode located furthest away from portions that first come into contact with portions on a second electrode side is connected with other electrode lines of the first electrode via the resistive members;
the electrode line functions as an output electrode; and
one of the electrode lines of the second electrode located furthest away from portions that first come into contact with portions on a first electrode side is connected with other electrode lines of the second electrode via the resistive members.

8. The impact sensor according to claim 1, wherein:
each of the first and the second resistive members is formed in a ridge that tapers towards a peak; and
the peak of the first resistive member first come into contact with that of the second resistive member at a time of a collision.

9. The impact sensor according to claim 1, wherein the elastic member is formed in a tube for housing the first and the second electrodes and fixed to the body of the vehicle in the side-to-side direction of the vehicle.

10. The impact sensor according to claim 1, wherein the elastic member is formed such that the contact area increases as the impact of a collision increases.

11. An impact sensor arranged along a body of a vehicle in a side-to-side direction of the vehicle for detecting an impact of a collision, comprising:
first and second electrodes, each of which has electric conductivity and a cord-shape;
a resistive member that has a cord-shape and a predetermined resistivity on at least one of surfaces, and attached to one of the first and the second electrodes; and
an elastic member that holds the electrodes and the resistive member, wherein
the elastic member has a shape and elasticity such that a contact area between the electrode that the resistive member is not attached and the resistive member varies gradually or stepwise according to the impact of a collision, and an electric resistance between the first and the second electrodes varies in positive correlation with the impact of a collision in a predetermined range.

12. The impact sensor according to claim 11, wherein:
the first and the second electrodes includes a plurality of electrode lines; and
the electrode lines of one of the first and the second electrode that the resistive member is not attached come into contact with the corresponding electrode lines of the other electrode via the resistive member according to the impact of a collision.

13. The impact sensor according to claim 11, wherein:
the resistive member includes a plurality of the resistive elements; and
the electrode lines of one of the first and the second electrodes to which the resistive member is attached are individually sheathed with the resistive elements.

14. The impact sensor according to claim 13, wherein:
the resistive elements have different rates of resistivity.

15. The impact sensor according to claim 13, wherein the resistive elements that sheath the electrode lines have approximately round cross-sections.

16. The impact sensor according to claim 13, wherein:
the resistive elements having different cross-sectional areas.

17. The impact sensor according to claim 11, wherein:
the resistive member is formed in a ridge that tapers towards a peak; and
the peak of the resistive member first come into contact with that of the electrode lines that the resistive member is not attached at a time of a collision.

18. The impact sensor according to claim 11, wherein:
the elastic member is formed in a tube for housing one of the first and the second electrodes and fixed to the body of the vehicle in the side-to-side direction of the vehicle.

19. The impact sensor according to claim 11, wherein the elastic member is formed such that the contact area increases as the impact of a collision increases.

20. The impact sensor according to claim 1, wherein
the first electrode includes at least first and second electrode lines,
the second electrode includes at least first and second electrode lines,
the first electrode line in the first electrode is configured to contact the first electrode line in the second electrode when the impact having a first magnitude is applied to the sensor,
the second electrode line in the first electrode is configured to contact the second electrode line in the second electrode when the impact having a second magnitude is applied to the sensor, and
the first magnitude of the impact is smaller than the second magnitude of the impact.

21. The impact sensor according to claim 20, wherein
the contact area between the first and the second resistive members is comparatively small when the first electrode line in the first electrode contacts the first electrode line in the second electrode, and the impact having the first magnitude is applied to the sensor, and
the contact area between the first and the second resistive members is comparatively large when the first and the second electrode lines in the first electrode contact the first and the second electrode lines in the second electrode, respectively, and the impact having the second magnitude is applied to the sensor.

* * * * *